(12) United States Patent
Urashima et al.

(10) Patent No.: US 8,735,768 B2
(45) Date of Patent: May 27, 2014

(54) LASER WELDING APPARATUS

(75) Inventors: Takashi Urashima, Fukuoka (JP); Shohei Aoki, Osaka (JP); Yasuhiro Kabetani, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/466,689

(22) Filed: May 8, 2012

(65) Prior Publication Data

US 2012/0285936 A1 Nov. 15, 2012

(30) Foreign Application Priority Data

May 10, 2011 (JP) .................................. 2011-104981

(51) Int. Cl.
*B23K 26/00* (2014.01)
*B23K 26/06* (2014.01)

(52) U.S. Cl.
USPC ................................ 219/121.63; 219/121.75

(58) Field of Classification Search
USPC ............... 219/121.11, 121.6, 121.62, 121.63, 219/121.65, 121.66, 121.74–76, 121.69, 219/121.64, 121.83; 356/492, 493
See application file for complete search history.

(56) References Cited

U.S. PATENT DOCUMENTS

| | | | |
|---|---|---|---|
| 4,069,080 A * | 1/1978 | Osborne ..................... | 156/272.8 |
| 4,767,911 A * | 8/1988 | Maram et al. ............ | 219/130.01 |
| 5,155,329 A | 10/1992 | Terada et al. | |
| 6,075,220 A * | 6/2000 | Essien et al. ............. | 219/121.63 |
| 6,713,718 B1 * | 3/2004 | Lu ............................. | 219/121.69 |
| 2006/0157457 A1 * | 7/2006 | Sakurai et al. ........... | 219/121.76 |
| 2007/0229843 A1 * | 10/2007 | Sesko .......................... | 356/493 |
| 2008/0023447 A1 * | 1/2008 | Holmgren et al. ......... | 219/121.6 |

FOREIGN PATENT DOCUMENTS

| | | |
|---|---|---|
| JP | 3-207587 | 9/1991 |
| JP | 9-182985 | 7/1997 |
| JP | 2003-170282 | 6/2003 |
| JP | 2004-306100 | 11/2004 |
| JP | 2005-131645 | 5/2005 |
| JP | 2006-326604 | 12/2006 |
| JP | 2011-189407 | 9/2011 |

* cited by examiner

*Primary Examiner* — Dana Ross
*Assistant Examiner* — Michael LaFlame, Jr.
(74) *Attorney, Agent, or Firm* — Hamre, Schumann, Mueller & Larson, P.C.

(57) ABSTRACT

A laser welding apparatus includes: a first optical element that coaxially emits, to a welded part, a laser beam emitted from a laser light source and an object beam having a different wavelength from the laser beam; a second optical element that causes the spot diameter of the object beam to be larger than the spot diameter of the laser beam on the welded part; an optical interferometer that emits the object beam to the first optical element, detects through the first optical element the object beam reflected on the welded part, and generates an electric signal based on the detected object beam; and a measuring unit that measures a penetration depth of the welded part based on the electric signal.

2 Claims, 9 Drawing Sheets

LASER WELDING APPARATUS

CROSS REFERENCE TO RELATED APPLICATIONS

The disclosure of Japanese Patent Application No. 2011-104981 filed May 10, 2011 including specification, drawings and claims is incorporated herein by reference in its entirety.

TECHNICAL FIELD

The present invention relates to a laser welding apparatus and a laser welding method which weld a part to be welded by a laser beam and evaluate the welded part.

BACKGROUND ART

Japanese Patent Laid-Open No. 3-207587 discloses a laser welding apparatus that evaluates the quality of a welded part by means of light emanating from the molten metal of the welded part. Referring to FIG. 9, the laser welding apparatus will be described below.

As illustrated in FIG. 9, the laser welding apparatus welds a workpiece 1 by irradiating the workpiece 1 with a laser beam 3. The laser beam 3 is continuously emitted with a constant intensity from a laser oscillator 11. The laser beam 3 emitted from the laser oscillator 11 is transmitted to an optical condenser system 13 through a laser-beam transmission optical system 12. The optical condenser system 13 focuses the laser beam 3 onto a welded part 2 and the workpiece 1 is welded by the focused laser beam 3. The molten metal of the welded part 2 emits light during the welding of the workpiece 1. The light emanating from the molten metal is focused by the optical condenser system 13 and then is transmitted to an interference filter 15 through a monitor-light transmission optical system 14. The interference filter 15 selects light having a wavelength component identical to that of the light emanating from the molten metal, out of light transmitted through the monitor-light transmission optical system 14. The light selected by the interference filter 15 is received by a photodiode 16. When receiving the light, the photodiode 16 generates a signal corresponding to the intensity of the received light. The signal generated by the photodiode 16 is inputted to a computer 19 through an amplifier 17 and an A/D converter 18. A correlation between an emission intensity of the molten metal of the welded part 2 and a penetration depth of the welded part 2 is stored beforehand in the computer 19. The computer 19 matches the signal inputted from the A/D converter 18 with the stored correlation, thereby deriving the penetration depth of the welded part 2. The computer 19 then evaluates the quality of the welded part 2 according to the derived penetration depth.

SUMMARY

As has been discussed, a known laser welding apparatus does not directly detect the penetration depth of a welded part but indirectly derives the penetration depth. The known laser welding apparatus detects the emission intensity of the molten metal of the welded part and then matches the detected emission intensity with a predetermined correlation between an emission intensity of the molten metal of the welded part and a penetration depth of the welded part, so that the penetration depth of the welded part is indirectly derived. The correlation between an emission intensity of the molten metal of the welded part and a penetration depth of the welded part, however, does not remain constant. The correlation varies depending on factors such as the material of a workpiece and the ambient temperature of the workpiece. Thus, the penetration depth of the welded part, which is indirectly derived from the emission intensity of the molten metal of the welded part, may deviate from the actual penetration depth and the quality of the welded part may be evaluated based on a value different from the actual penetration depth. Unfortunately, the known laser welding apparatus cannot evaluate a welded part with high accuracy.

An object of the embodiments is to provide a laser welding apparatus and a laser welding method which can solve the problem. Specifically, an object of the embodiments is to provide a laser welding apparatus and a laser welding method which can evaluate a welded part with high accuracy by measuring the penetration depth of the welded part.

In order to attain the object, a laser welding apparatus according to the embodiment is a laser welding apparatus for welding by a laser beam, the laser welding apparatus including: a laser light source that emits the laser beam; a first optical element that coaxially emits, to a welded part, the laser beam and an object beam having a different wavelength from the laser beam; a second optical element that causes the spot diameter of the object beam to be larger than the spot diameter of the laser beam on the welded part; an optical interferometer that emits the object beam to the first optical element, detects through the first optical element the object beam reflected on the welded part, and generates an electric signal based on the detected object beam; a measuring unit that measures the penetration depth of the welded part based on the electric signal; and an evaluating unit that evaluates the welded part based on the penetration depth of the welded part.

A laser welding method according to the embodiment is a laser welding method for welding by a laser beam, the method including the steps of: coaxially emitting, to a welded part, the laser beam and an object beam having a different wavelength from the laser beam such that the object beam has a spot diameter larger than the spot diameter of the laser beam on the welded part; generating an electric signal by means of an optical interferometer based on the object beam reflected on the welded part; measuring a penetration depth of the welded part based on the generated electric signal; and evaluating the welded part based on the penetration depth of the welded part.

According to the embodiments, the penetration depth of the welded part can be directly detected. Thus, the embodiments can evaluate the welded part with high accuracy. The embodiments are further applicable to laser welding on an automobile, an electronic component, and so on.

DESCRIPTION OF THE EMBODIMENTS

Figure 1:
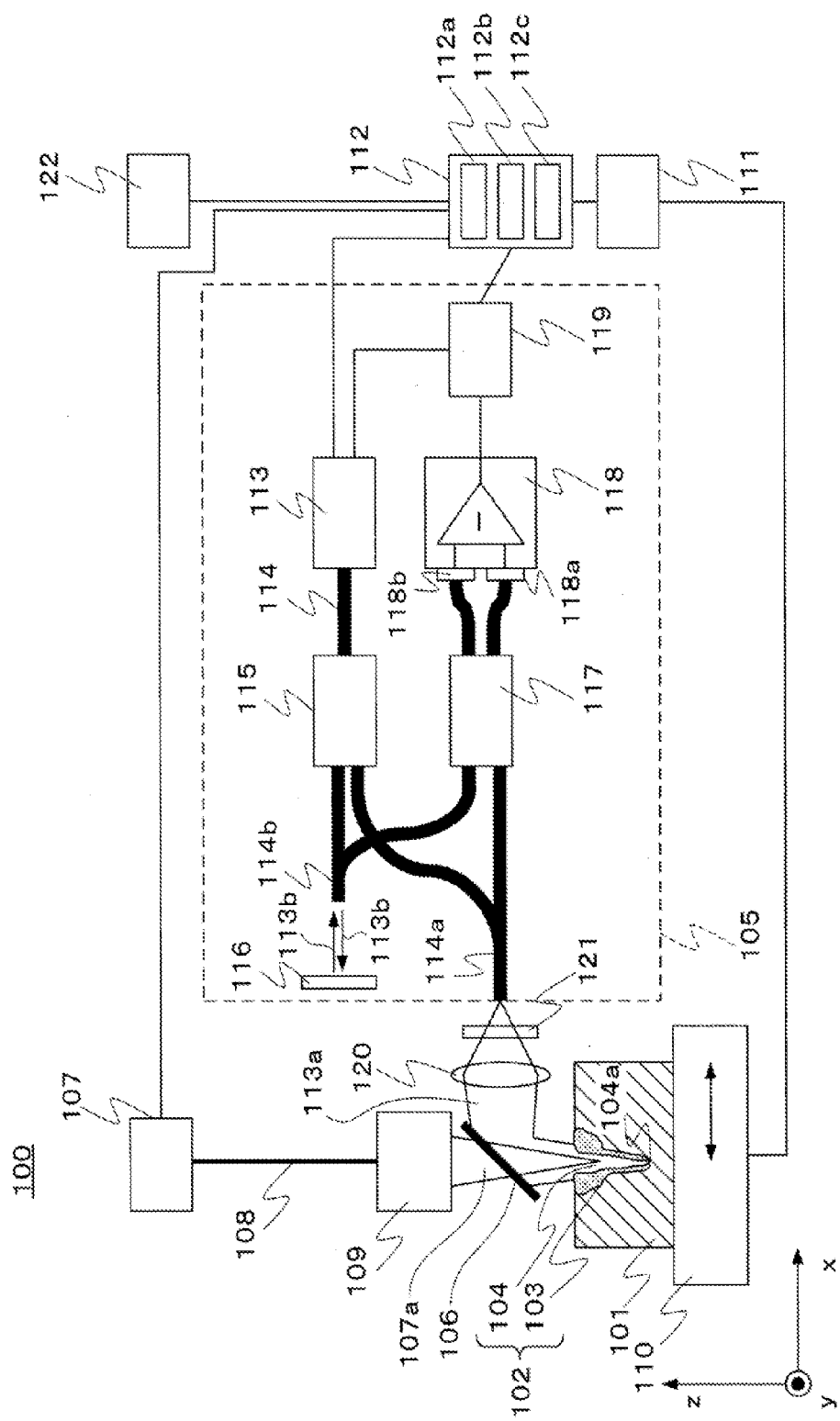
FIG. 1 is a schematic diagram illustrating the schematic configuration of a laser welding apparatus according to a first embodiment.

Embodiments will be described below with reference to the accompanying drawings. The same constituent elements are indicated by the same reference numerals and the explanation thereof may be omitted.

First Embodiment

FIG. 1 is a schematic diagram illustrating a laser welding apparatus 100 according to a first embodiment. The outline of the laser welding apparatus 100 will be first discussed below.

As illustrated in FIG. 1, in the laser welding apparatus 100, a laser beam 107a is emitted from a laser oscillator 107, which is an example of a laser light source, during welding on a workpiece 101 that extends in the horizontal direction (x direction in FIG. 1). The laser beam 107a is emitted perpendicularly (z direction in FIG. 1) to the surface of the workpiece 101. Thus, a part to be welded (the same portion as a welded part 102) of the workpiece 101 melts from the top so as to form a molten pool 103 on the welded part 102. Moreover, molten metal evaporates from the molten pool 103 during the melting of the welded part 102. The pressure of steam generated by the evaporation forms a keyhole 104. In this case, the molten pool 103 and the keyhole 104 constitute the welded part 102.

Furthermore, during the welding on the welded part 102 in the laser welding apparatus 100, a first beam splitter 106, which is an example of a first optical element, concentrically and coaxially superimposes the laser beam 107a and an object beam 113a emitted from an optical interferometer 105. The object beam 113a is emitted into the keyhole 104 and then is reflected at a bottom 104a of the keyhole 104. The object beam 113a reflected at the bottom 104a of the keyhole 104 is incident on the optical interferometer 105 through the first beam splitter 106. In other words, the optical interferometer 105 detects the object beam 113a reflected at the bottom 104a of the keyhole 104, through the first beam splitter 106. The optical interferometer 105 has a structure for measuring the optical path length of the object beam 113a.

The laser welding apparatus 100 measures the optical path length of the object beam 113a directed to the bottom 104a of the keyhole 104, by means of the optical interferometer 105. Moreover, the laser welding apparatus 100 specifies the depth of the keyhole 104 as a penetration depth of the welded part 102 according to the measured optical path length and then determines the quality of welding on the welded part 102 based on the specified penetration depth.

Furthermore, in the laser welding apparatus 100, the spot diameter of the object beam 113a on the workpiece 101 is larger than that of the laser beam 107a located at the same position and thus the bottom 104a of the keyhole 104 is properly irradiated with the object beam 113a. The reason will be discussed later. It is therefore possible to precisely detect the position of the bottom 104a of the keyhole 104, that is, the depth of the keyhole 104. The depth of the keyhole 104 can be regarded as the penetration depth of the welded part 102. In other words, the laser welding apparatus 100 can measure the penetration depth of the welded part 102 with high accuracy.

The outline of the laser welding apparatus 100 was described in the foregoing explanation. The constituent elements of the laser welding apparatus 100 will be discussed below.

First, the constituent elements for a laser welding function in the laser welding apparatus 100 will be described below.

The laser beam 107a oscillated from the laser oscillator 107, which is an example of a laser light source, is guided to a first optical condenser system 109 through a laser-beam transmission optical system 108. The first optical condenser system 109 focuses the laser beam 107a on the welded part 102. The workpiece 101 is welded by the focused laser beam 107a. The first beam splitter 106 that allows the passage of the laser beam 107a is disposed between the first optical condenser system 109 and the workpiece 101. The laser oscillator 107 is, for example, a YAG laser.

The workpiece 101 is fixed on a movable stage 110, which is an example of a moving mechanism. While the laser oscillator 107 oscillates the laser beam 107a, the movable stage 110 moves to change the irradiation position of the laser beam 107a on the workpiece 101. The movement of the movable stage 110 can achieve laser welding in a desired range. The movable stage 110 is driven by a stage controller 111. The stage controller 111 drives the movable stage 110 in response to a command from a control unit 112a of a computer 112.

The control unit 112a of the computer 112 is electrically connected also to the laser oscillator 107. The control unit 112a has the function of controlling the starting and stopping of emission of the laser beam 107a and the function of controlling the output intensity of the laser beam 107a in addition to the function of controlling the moving speed of the movable stage 110.

The foregoing explanation described the constituent elements having the laser welding function in the laser welding apparatus 100. The following will discuss the constituent elements having the function of measuring the penetration depth of the welded part 102 in the laser welding apparatus 100.

The laser welding apparatus 100 measures the penetration depth of the welded part 102 by using a technique of swept source optical coherence tomography (SS-OCT).

The optical interferometer 105 has a structure for performing SS-OCT. A wavelength-scanning light source 113 provided in the optical interferometer 105 emits a laser beam having a different wavelength from the laser beam 107a oscillated from the laser oscillator 107. In the following explanation, a laser beam emitted from the wavelength-scanning light source 113 will be referred to as a measuring beam.

Figure 2:
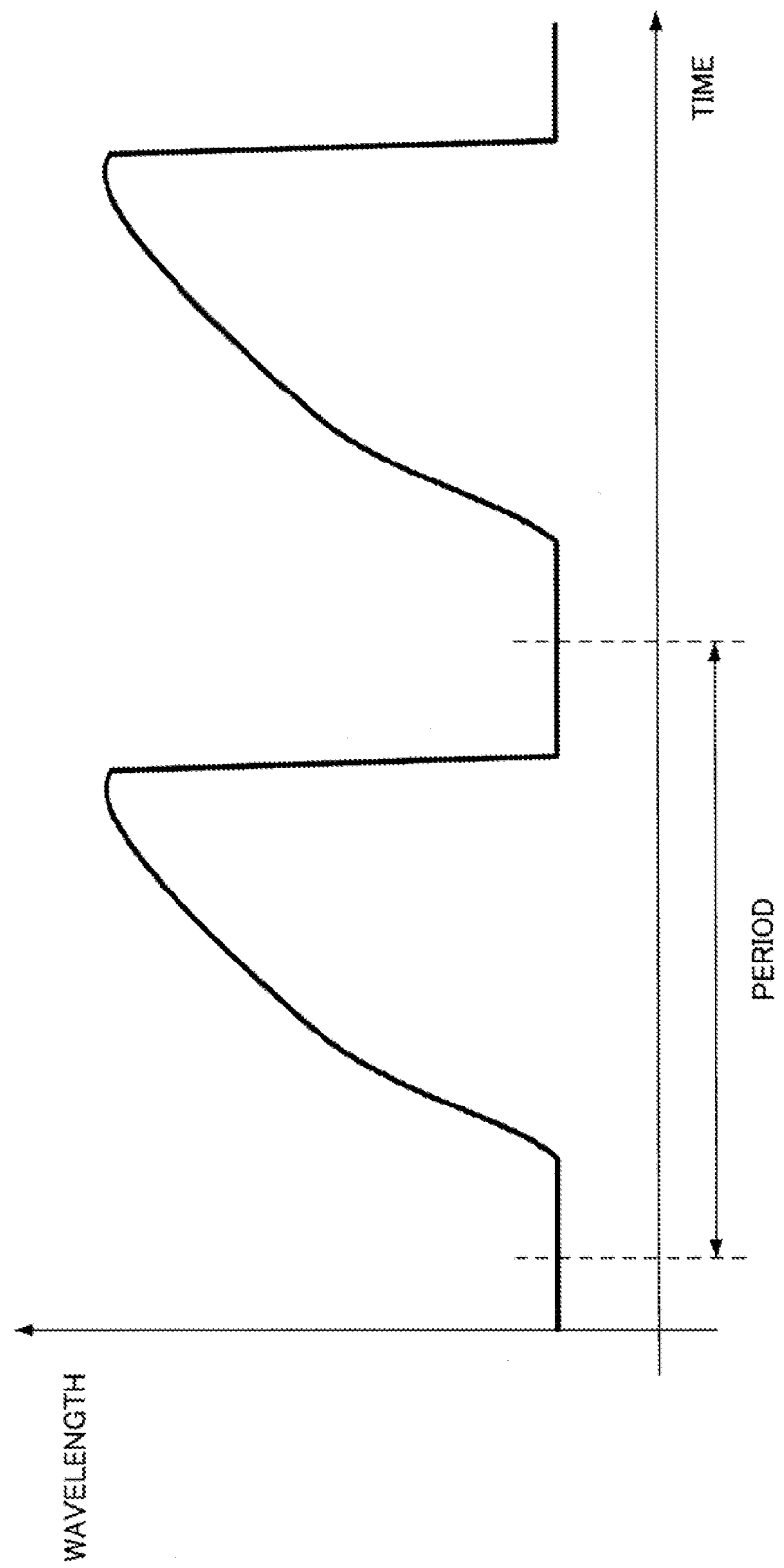
FIG. 2 shows a time-varying wavelength of a measuring beam emitted from a wavelength-scanning light source according to the first embodiment.

The wavelength-scanning light source 113 continuously emits the measuring beam having a small wavelength band. Moreover, the wavelength-scanning light source 113 periodically changes the center wavelength of the measuring beam as shown in FIG. 2. The vertical axis and the horizontal axis of a graph in FIG. 2 indicate a measuring beam wavelength and a time, respectively. The periodic change of a light wavelength is generally called wavelength scanning.

The measuring beam emitted from the wavelength-scanning light source 113 passes through a fiber optic system 114 and is incident on a first fiber coupler 115. The measuring beam incident on the first fiber coupler 115 is split into the object beam 113a and a reference beam 113b. The object beam 113a means a measuring beam directed to the welded part 102 to be measured and the reference beam 113b means a measuring beam directed to a reference mirror 116 serving as a reference plane. The first fiber coupler 115 causes the object beam 113a to enter a first fiber optic system 114a and the reference beam 113b to enter a second fiber optic system 114b. The object beam 113a accounts for 50% of the measuring beam incident on the first fiber coupler 115 and the reference beam 113b accounts for the other 50%.

The object beam 113a passes through the first fiber optic system 114a and exits from the optical interferometer 105. The object beam 113a emitted from the optical interferometer 105 is directed to the welded part 102. The object beam 113a reflected on the welded part 102 is incident on the optical interferometer 105. The object beam 113a incident on the optical interferometer 105 passes through the first fiber optic system 114a and is incident on a second fiber coupler 117. An optical path length from the first fiber coupler 115 to the second fiber coupler 117 through the welded part 102 is the optical path length of the object beam 113a. The first fiber optic system 114a may include a circulator that guides the object beam 113a from the first fiber coupler 115 to the outside of the optical interferometer 105 and guides the object beam 113a incident on the optical interferometer 105 to the second fiber coupler 117.

The reference beam 113b passes through the second fiber optic system 114b and strikes the reference mirror 116. The reference beam 113b reflected on the reference mirror 116 strikes the second fiber optic system 114b. The reference beam 113b incident on the second fiber optic system 114b passes through the second fiber optic system 114b and strikes the second fiber coupler 117. An optical path length from the first fiber coupler 115 to the second fiber coupler 117 through the reference mirror 116 is the optical path length of the reference beam 113b. The optical path length of the reference beam 113b is measured beforehand as a reference value. The second fiber optic system 114b may include a circulator that guides the reference beam 113b from the first fiber coupler 115 to the reference mirror 116 and guides, to the second fiber coupler 117, the reference beam 113b reflected on the reference mirror 116.

The second fiber coupler 117 couples the object beam 113a passing through the first fiber optic system 114a and the reference beam 113b passing through the second fiber optic system 114b in a 50:50 ratio. The first fiber optic system 114a is connected to a first input terminal 118a of a differential detector 118 via the second fiber coupler 117. The second fiber optic system 114b is connected to a second input terminal 118b of the differential detector 118 via the second fiber coupler 117. Specifically, 50% of the object beam 113a that is incident on the second fiber coupler 117 from the first fiber optic system 114a directly enters the first input terminal 118a of the differential detector 118 and the other 50% of the object beam 113a is caused to enter the second input terminal 118b of the differential detector 118 by the operation of the second fiber coupler 117. Likewise, 50% of the reference beam 113b that is incident on the second fiber coupler 117 from the second fiber optic system 114b directly enters the second input terminal 118b of the differential detector 118 and the other 50% of the reference beam 113b is caused to enter the first input terminal 118a of the differential detector 118 by the operation of the second fiber coupler 117. At this point, the reference beam 113b and the object beam 113a are combined into a single beam of light, generating coherent light. Thus, the coherent light is incident on the first input terminal 118a and the second input terminal 118b of the differential detector 118.

The differential detector 118 determines a differential component between the coherent light generated by the reference beam 113b and the object beam 113a on the first input terminal 118a and the coherent light generated by the reference beam 113b and the object beam 113a on the second input terminal 118b, thereby removing noise. Thus, an electric signal is generated according to the intensity of the noise-free coherent light in the differential detector 118. Specifically, in the differential detector 118, a differential component is generated between an electric signal corresponding to the intensity of the coherent light on the first input terminal 118a and an electric signal corresponding to the intensity of the coherent light on the second input terminal 118b. An electric signal converted from the coherent light (a differential component between the two electric signals generated in the differential detector 118) is transmitted to an A/D converter 119.

The reason for the provision of the differential detector 118 will be discussed below. The laser welding apparatus 100 measures the penetration depth of the welded part 102 being irradiated with the laser beam 107a from the laser oscillator 107, by means of the optical interferometer 105. Hence, light emitted from the welded part 102 (light emanating from molten metal) causes noise that affects the accuracy of measurement using the optical interferometer 105. The differential detector 118 is provided to reduce the influence of noise.

The function of the differential detector 118 will be described in detail. The operation of the second fiber coupler 117 causes the phase of the object beam 113a incident on the second input terminal 118b of the differential detector 118 from the first fiber optic system 114a to be delayed from the phase of the object beam 113a incident on the first input terminal 118a of the differential detector 118 by $\lambda/4$. This phenomenon also occurs on the reference beam 113b. Thus, the phase of the coherent light incident on the second input terminal 118b of the differential detector 118 is reversed from that of the coherent light incident on the first input terminal 118a of the differential detector 118. This allows the differential detector 118 to convert the coherent light incident on the first input terminal 118a and the second input terminal 118b to the electric signals corresponding to the respective intensities of the coherent light and determine a difference between the electric signals, thereby eliminating the influence of light emitted from the welded part 102.

The A/D converter 119 receives a trigger output from the wavelength-scanning light source 113 in synchronization with a repetition frequency of wavelength scanning, and converts the electric signal (analog signal) of the coherent light from the differential detector 118 into a digital signal in synchronization with the repetition period of the wavelength-scanning light source 113. The digital signal (electric signal) of the coherent light is inputted to the computer 112.

The computer 112 includes a measuring unit 112b that measures the penetration depth of the welded part 102 based on the electric signal (digital signal) of the coherent light from the A/D converter 119. Coherence in the coherent light corresponds to a difference between the optical path length of the object beam 113a and the optical path length of the reference beam 113b. The measuring unit 112b measures the penetration depth of the welded part 102 based on the coherence. Specifically, the measuring unit 112b performs, for example, a fast Fourier transform (FFT) on the electric signal (digital signal) of the coherent light from the A/D converter 119 and then measures the penetration depth of the welded part 102 based on the FFT result.

The foregoing explanation described the constituent elements having the function of measuring a penetration depth in the laser welding apparatus 100.

The laser welding apparatus 100 has a configuration for the function of measuring a penetration depth and a configuration for the laser welding function. To perform the functions in parallel, the laser welding apparatus 100 is further configured as follows.

The laser welding apparatus 100 includes the first beam splitter 106 as an example of the first optical element that combines the laser beam 107a from the laser oscillator 107 and the object beam 113a from the optical interferometer 105 into a coaxial beam of light. The laser beam 107a and the object beam 113a are combined into a coaxial beam of light by the first beam splitter 106 and then the coaxial beam is directed to the welded part 102. The coaxial radiation of the laser beam 107a and the object beam 113a makes it possible to measure the penetration depth of the welded part 102 during laser welding. For example, in order to allow the passage of the laser beam 107a from the laser oscillator 107 and the reflection of the object beam 113a from the optical interferometer 105, the wavelength of transmitted light and the wavelength of reflected light are set in the first beam splitter 106. The first beam splitter 106 may be, for example, a dichroic mirror.

Moreover, a wavelength difference between the laser beam 107a and the object beam 113a is desirably 100 nm or larger to sufficiently split the laser beam 107a and the object beam 113a on the first beam splitter 106. For example, the laser oscillator 107 oscillates the laser beam 107a having a wavelength from 1064 nm to 1090 nm and the wavelength-scanning light source 113 scans the wavelength of the measuring beam (object beam 113a) having a wavelength from 1270 nm to 1370 nm. The period of wavelength scanning of the wavelength-scanning light source 113 is, for example, 0.5 ms.

Preferably, a second optical condenser system 120 is provided between the optical interferometer 105 and the first beam splitter 106 as an example of a second optical element that focuses the object beam 113a. The second optical condenser system 120 focuses the object beam 113a outgoing from the first fiber optic system 114a of the optical interferometer 105, to the welded part 102 through the first beam splitter 106. Moreover, the second optical condenser system 120 causes the object beam 113a reflected from the welded part 102 to enter the first fiber optic system 114a again through the first beam splitter 106.

Preferably, an interference filter 121 is provided between the first fiber optic system 114a of the optical interferometer 105 and the second optical condenser system 120. The interference filter 121 allows only the passage of light having a wavelength equal to the wavelength of the object beam 113a. The interference filter 121 is provided immediately before the end of the first fiber optic system 114a to prevent a light beam reflected on the welded part 102 and light emitted from the welded part 102 from being incident on the first fiber optic system 114a.

With this configuration, the laser welding apparatus 100 can simultaneously perform the function of measuring a penetration depth and the laser welding function. However, this configuration alone may not correctly measure the penetration depth of the welded part 102 during laser welding. For example, the measured depth of the keyhole 104 may be smaller than an actual depth as will be described below.

The keyhole 104 is formed by the pressure of steam generated by evaporation of molten metal in the welded part 102. The shape of the keyhole 104 varies depending upon the irradiation time of the laser beam 107a and the state of the molten pool 103. Thus, the bottom 104a of the keyhole 104 may not be aligned with the center of the spot of the laser beam 107a. In this case, the object beam 113a coaxially combined with the laser beam 107a may not reach the bottom 104a of the keyhole 104.

The optical interferometer 105 has a structure for measuring the reflection position of the object beam 113a. The laser welding apparatus 100 measures the reflection position of the object beam 113a as the position of the bottom 104a of the keyhole 104, that is, the depth of the keyhole 104. Thus, in the case where the object beam 113a does not reach the bottom 104a of the keyhole 104 but reaches only the inner surface of the keyhole 104, the irradiation position of the object beam 113a on the inner surface of the keyhole 104 is measured as the position of the bottom 104a of the keyhole 104. Hence, the measured depth of the keyhole 104 is smaller than the actual depth unless the bottom 104a of the keyhole 104 is irradiated with the object beam 113a. In the case where the measured depth of the keyhole 104 is smaller than the actual depth, the welded part 102 cannot be precisely inspected.

In order to prevent the depth of the keyhole 104 from being measured to be smaller than the actual depth, the object beam 113a needs to be properly directed to the bottom 104a of the keyhole 104. The following will describe a configuration for properly directing the object beam 113a to the bottom 104a of the keyhole 104.

In the first embodiment, the first optical condenser system 109 and the second optical condenser system 120 focus the laser beam 107a and the object beam 113a such that the spot diameter of the object beam 113a is larger than that of the laser beam 107a on the surface of the workpiece 101. This configuration allows the overall keyhole 104 to be irradiated with the object beam 113a. The radiation of the object beam 113a over the keyhole 104 securely reaches the bottom 104a of the keyhole 104. Thus, even in the case where the center position of the spot of the laser beam 107a is not aligned with the position of the bottom 104a of the keyhole 104, the object beam 113a reaches the bottom 104a of the keyhole 104.

The following will describe the relationship between the spot diameter of the laser beam 107a and the spot diameter of the object beam 113a, the relationship enabling the object beam 113a to reach the bottom 104a of the keyhole 104 with higher reliability.

Figure 3:
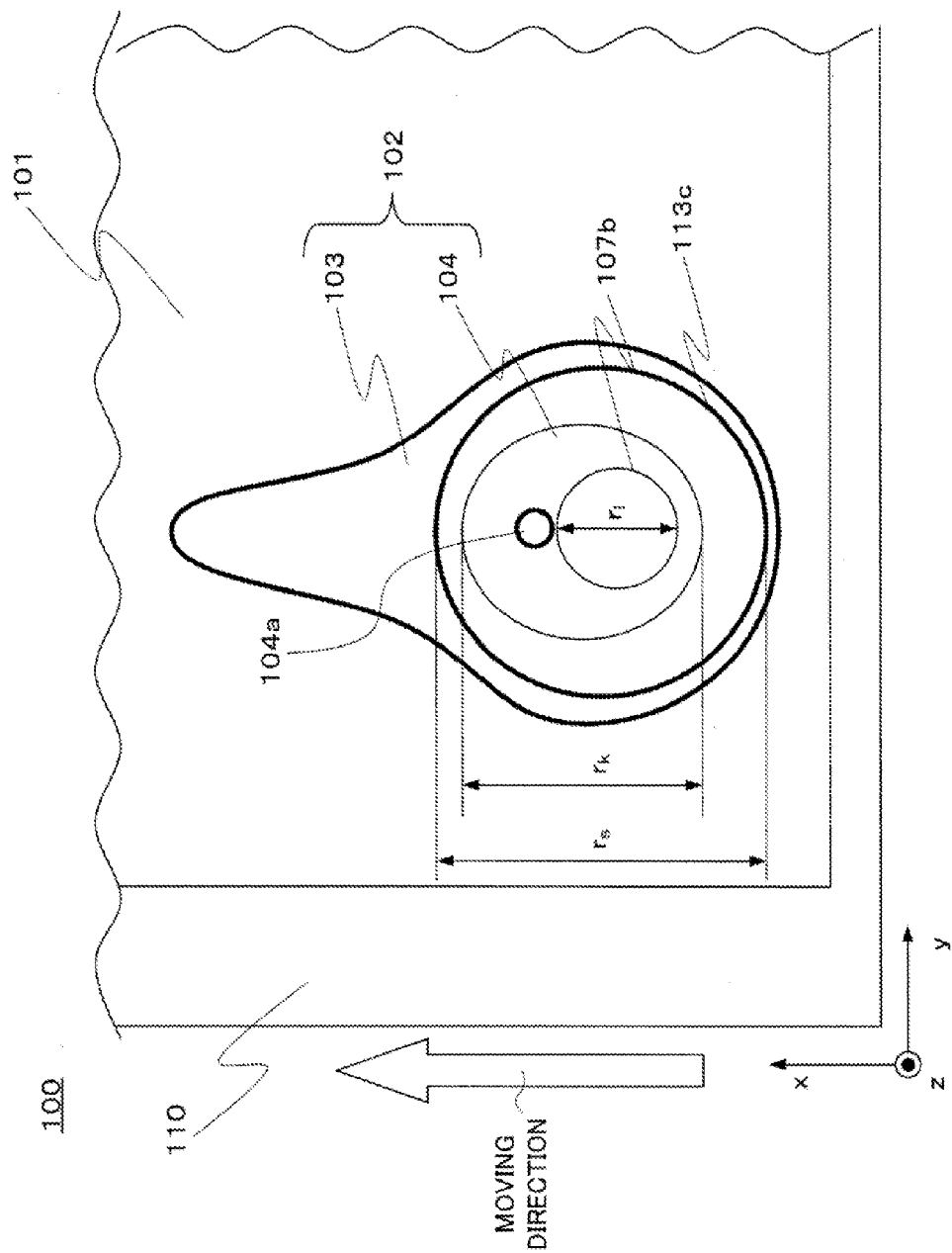
FIG. 3 is a schematic diagram illustrating the positional relationship between a keyhole, the spot of an object beam, and the spot of a laser beam according to the first embodiment.

FIG. 3 is a plan view illustrating the welded part 102 viewed in the vertical direction (z direction). FIG. 3 shows the positional relationship between a spot 107b of the laser beam 107a, a spot 113c of the object beam 113a, the keyhole 104, and the molten pool 103. The movable stage 110 having the workpiece 101 fixed thereon moves in a moving direction (x direction) indicated by an arrow in FIG. 3. In the first embodiment, as illustrated in FIG. 3, the spot 107b of the laser beam 107a and the spot 113c of the object beam 113a are both circular. As illustrated in FIG. 3, the laser beam 107a has a spot diameter (diameter) of $r_l$ on the surface of the workpiece 101 and the object beam 113a has a spot diameter (diameter) of $r_s$ on the surface of the workpiece 101.

The irradiation position of the laser beam 107a changes as the workpiece 101 is moved by the movable stage 110. As the irradiation position of the laser beam 107a changes, the keyhole 104 alters the shape to an oval that has a major axis along the moving direction of the workpiece 101, as illustrated in FIG. 3, when the welded part 102 is viewed in the vertical direction (z direction). The length of the major axis of the keyhole 104 is denoted as $r_k$.

The length $r_k$ of the major axis of the keyhole 104 tends to increase with the intensity of the laser beam 107a, whereas the length $r_k$ tends to decrease with a reduction in the radiation time of the laser beam 107a, that is, an increase in the moving speed of the movable stage 110.

In the case where a laser beam forms the keyhole 104 such that the length $r_k$ of the major axis of the keyhole 104 is at least three times larger than the spot diameter $r_l$ of the laser beam 107a, such a strong laser beam forms a hole through the workpiece 101 and thus is not suitable for laser welding. Likewise, it is not preferable that the movable stage 110 moves at a moving speed where the length $r_k$ of the major axis of the keyhole 104 is at least three times larger than the spot diameter $r_l$ of the laser beam 107a. Hence, in laser welding, the length $r_k$ of the major axis of the keyhole 104 is less than three times the spot diameter $r_l$ of the laser beam 107a. The relationship between the spot diameter $r_l$ of the laser beam 107a and the length $r_k$ of the major axis of the keyhole 104 can be expressed as expression 1 below.

$$r_l < r_k \leq 3r_l \quad \text{(expression 1)}$$

Since the radiation of the laser beam 107a onto the workpiece 101 forms the keyhole 104, the position of the keyhole 104 is not so deviated from the position of the spot 107b of the laser beam 107a. Thus, in the case where the spot diameter $r_s$ of the object beam 113a coaxial with the laser beam 107a is at least three times larger than the spot diameter $r_l$ of the laser beam 107a, the keyhole 104 is completely contained in the spot 113c of the object beam 113a. In the case where the keyhole 104 is completely contained in the spot 113c of the object beam 113a, the bottom 104a of the keyhole 104 is securely irradiated with the object beam 113a.

In other words, in the case where the spot diameter $r_s$ of the object beam 113a is at least three times larger than the spot diameter $r_l$ of the laser beam 107a, the bottom 104a of the keyhole 104 is securely irradiated with the object beam 113a, so that the depth of the keyhole 104 can be precisely measured. The object beam 113a reflected at a location other than the keyhole 104 causes noise that does not contribute to the measurement of the depth of the keyhole 104. The larger the spot diameter $r_s$ of the object beam 113a, the greater the influence of noise. The inventors found that in the case where the spot diameter $r_s$ of the object beam 113a is up to ten times larger than the spot diameter $r_l$ of the laser beam, the influence of noise diminishes so as to enable the measurement of the depth of the keyhole 104. Hence, the spot diameter $r_s$ of the object beam 113a is preferably set at three times to ten times larger than the spot diameter $r_l$ of the laser beam 107a. The setting of the spot diameter $r_s$ of the object beam 113a makes it possible to securely irradiate the bottom 104a of the keyhole 104 with the object beam 113a, thereby precisely measuring the depth of the keyhole 104, that is, the penetration depth of the welded part 102.

For example, in the laser welding apparatus 100 illustrated in FIG. 1, the laser beam port of the laser-beam transmission optical system 108, which guides the laser beam 107a oscillated by the laser oscillator 107 to the first optical condenser system 109, has a diameter of 100 μm and the first optical condenser system 109 has a magnification of imaging of 0.5×. In this case, the diameter of the object beam outlet of the first fiber optic system 114a is set at 10 μm and the magnification of imaging of the second optical condenser system 120 is set at 15×. Thus, in FIG. 3, the spot diameter $r_l$ of the laser beam 107a is 50 μm and the spot diameter $r_s$ of the object beam 113a is 150 μm, which is three times larger than the spot diameter $r_l$ of the laser beam 107a.

In order to easily adjust the spot diameter $r_l$ of the laser beam 107a and the spot diameter $r_s$ of the object beam 113a, the focal position of the first optical condenser system 109 is preferably aligned with that of the second optical condenser system 120 between the surface of the part to be welded (the surface of the workpiece 101) and a desired penetration depth.

As has been discussed, the laser welding apparatus 100 properly adjusts the spot diameters of the laser beam 107a and the object beam 113a, thereby precisely measuring the penetration depth of the welded part 102. A specific method for measuring the penetration depth of the welded part 102 will be described below.

Figure 4:
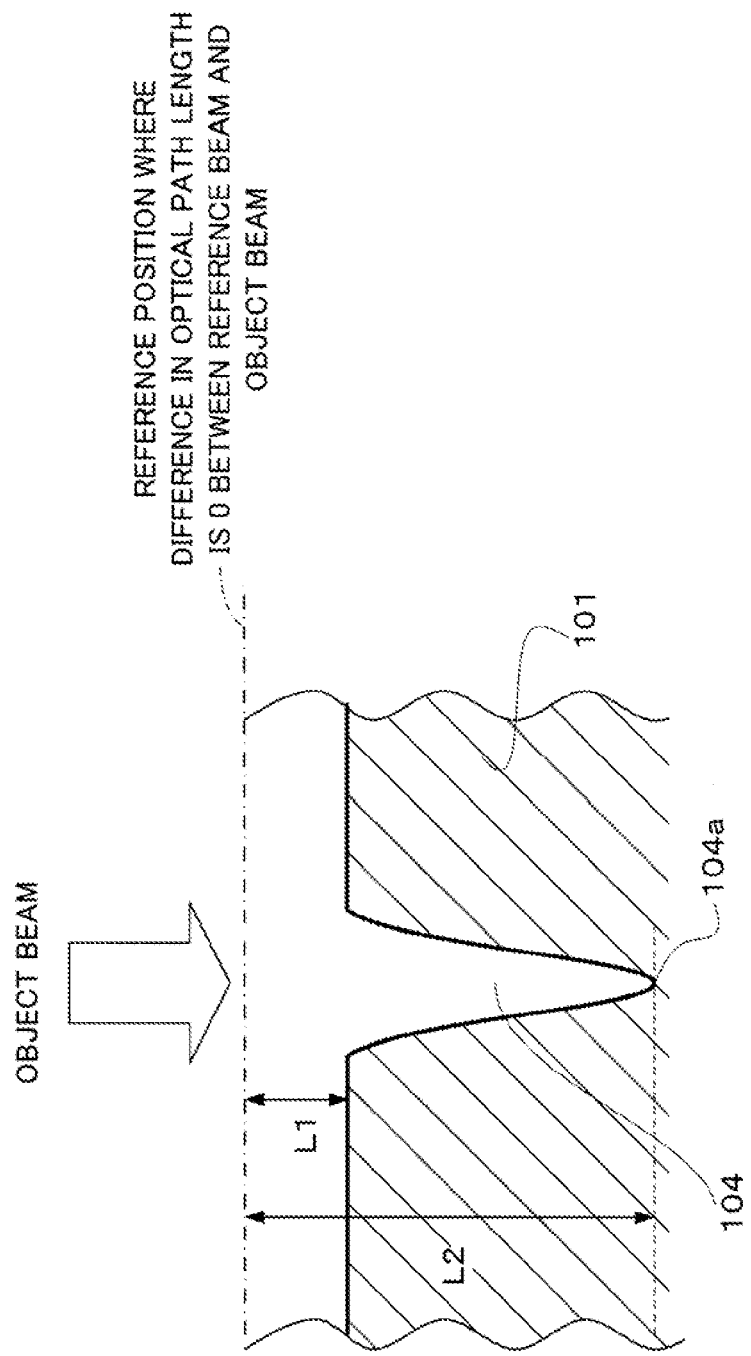
FIG. 4 is an explanatory drawing showing the principle of measurement of the depth of the keyhole according to the first embodiment.

FIG. 4 is an explanatory drawing showing the principle of measurement of the depth of the keyhole 104 by the object beam 113a. When the keyhole 104 is located in the spot of the object beam 113a, the object beam 113a is reflected from the surface of the workpiece 101 and the bottom 104a of the keyhole 104. The optical interferometer 105 has a structure for measuring a difference between a reference optical path length, which is the optical path length of the reference beam 113b, and the optical path length of the object beam 113a. It is therefore possible to measure a difference between the reference optical path length (the optical path length of the reference beam 113b) and the optical path length of the object beam 113a that is directed to the surface of the workpiece 101 and then is reflected from the surface of the workpiece 101, and a difference between the reference optical path length (the optical path length of the reference beam 113b) and the optical path length of the object beam 113a that is directed to the bottom 104a of the keyhole 104 and then is reflected from the bottom 104a of the keyhole 104.

A dotted line in FIG. 4 indicates a reference position where a difference in optical path length between the reference beam 113b and the object beam 113a is 0. Reference character L1 denotes an optical path length from the reference position to the surface of the workpiece 101 and reference character L2 denotes an optical path length from the reference position to the bottom 104a of the keyhole 104. In other words, L1 is a half of a difference between the reference optical path length (the optical path length of the reference beam 113b) and the optical path length of the object beam 113a reflected on the surface of the workpiece 101 after being directed to the surface of the workpiece 101 and L2 is a half of a difference between the reference optical path length (the optical path length of the reference beam 113b) and the optical path length of the object beam 113a reflected at the bottom 104a of the keyhole 104 after being directed to the bottom 104a of the keyhole 104.

Figure 5:
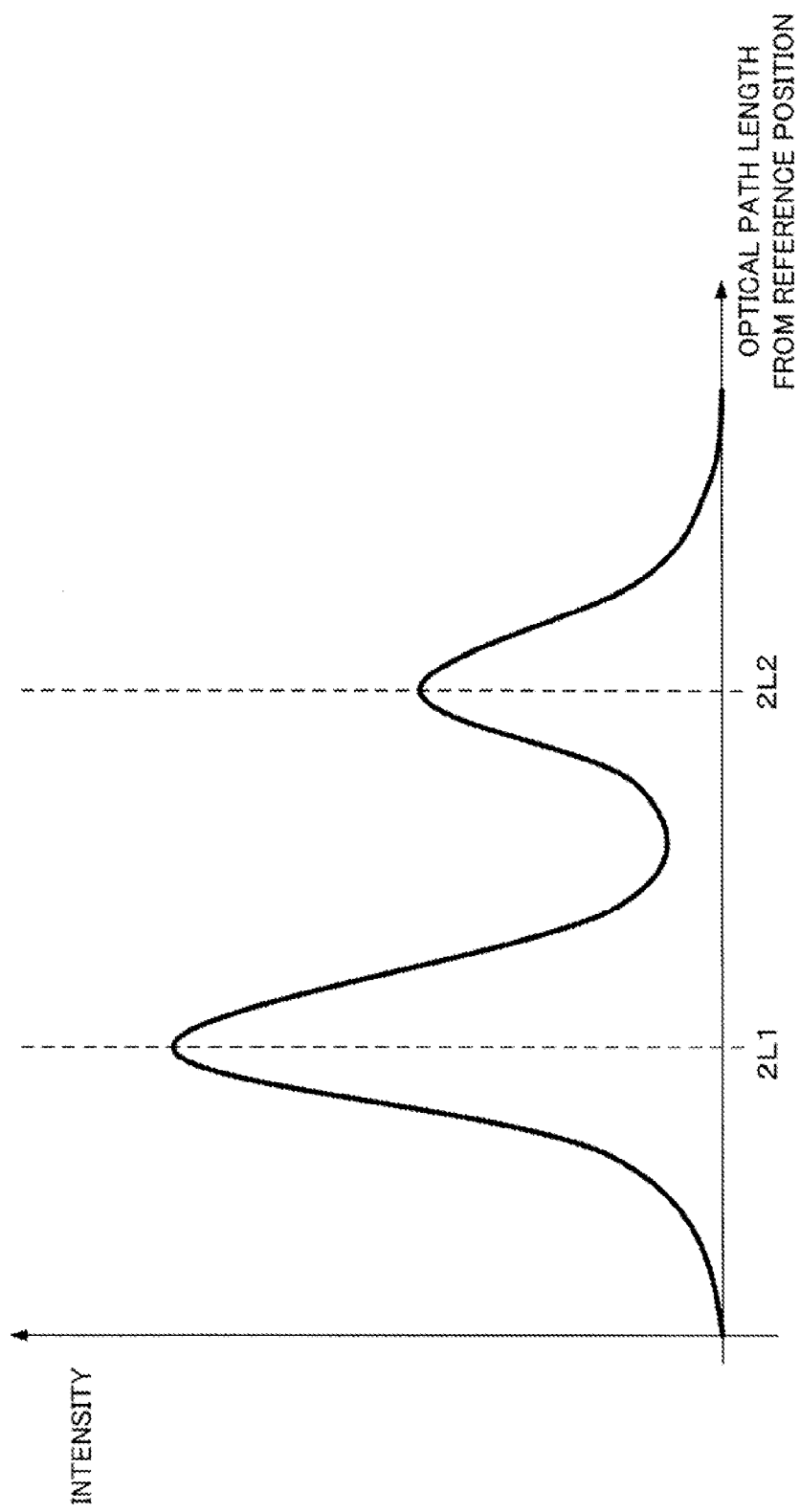
FIG. 5 shows the relationship between a difference in optical path length between the object beam and a reference beam and the intensity of coherent light according to the first embodiment.

FIG. 5 shows the relationship between a difference in optical path length between the object beam 113a and the reference beam 113b and the intensity of coherent light. The vertical axis of a graph in FIG. 5 represents the intensity of coherent light. The horizontal axis of the graph in FIG. 5 represents an optical path length from the reference position (the position indicated by the dotted line in FIG. 4) where a difference in optical path length between the object beam 113a and the reference beam 113b is 0. In the case where the keyhole 104 is located in the spot of the object beam 113a, the intensity of the object beam 113a directed to the surface of the workpiece 101 increases and the intensity of the object beam 113a directed to the bottom 104a of the keyhole 104 also increases. As shown in FIG. 5, coherent light peaks at optical path lengths of 2L1 and 2L2 from the reference position. By determining a value 0.5-times a distance between the two peaks, a distance from the surface of the workpiece 101 to the bottom 104a of the keyhole 104, that is, the depth of the keyhole 104 is obtained. The depth of the keyhole 104 corresponds to the penetration depth of the welded part 102.

This method enables the measurement of the penetration depth of the welded part 102. Referring to FIG. 1, the following will describe a method of evaluating the welded part 102 based on the measured penetration depth of the welded part 102.

The computer 112 includes an evaluating unit 112c that evaluates the quality of the welded part 102 based on the measured penetration depth of the welded part 102. The computer 112 further includes a storage (not shown) that stores the range of depths of penetration of non-defective items beforehand. The evaluating unit 112c decides whether or not the measured penetration depth is in the range of depths of penetration of non-defective items, so that the quality of the welded part 102 is evaluated. The evaluation result is displayed on a display 122.

In the case where the penetration depth of the welded part 102 exceeds the range of depths of penetration of non-defective items and the evaluating unit 112c decides that the welded part 102 is defective, the laser welding apparatus 100 stops laser beam radiation and the laser welding operation.

Figure 6:
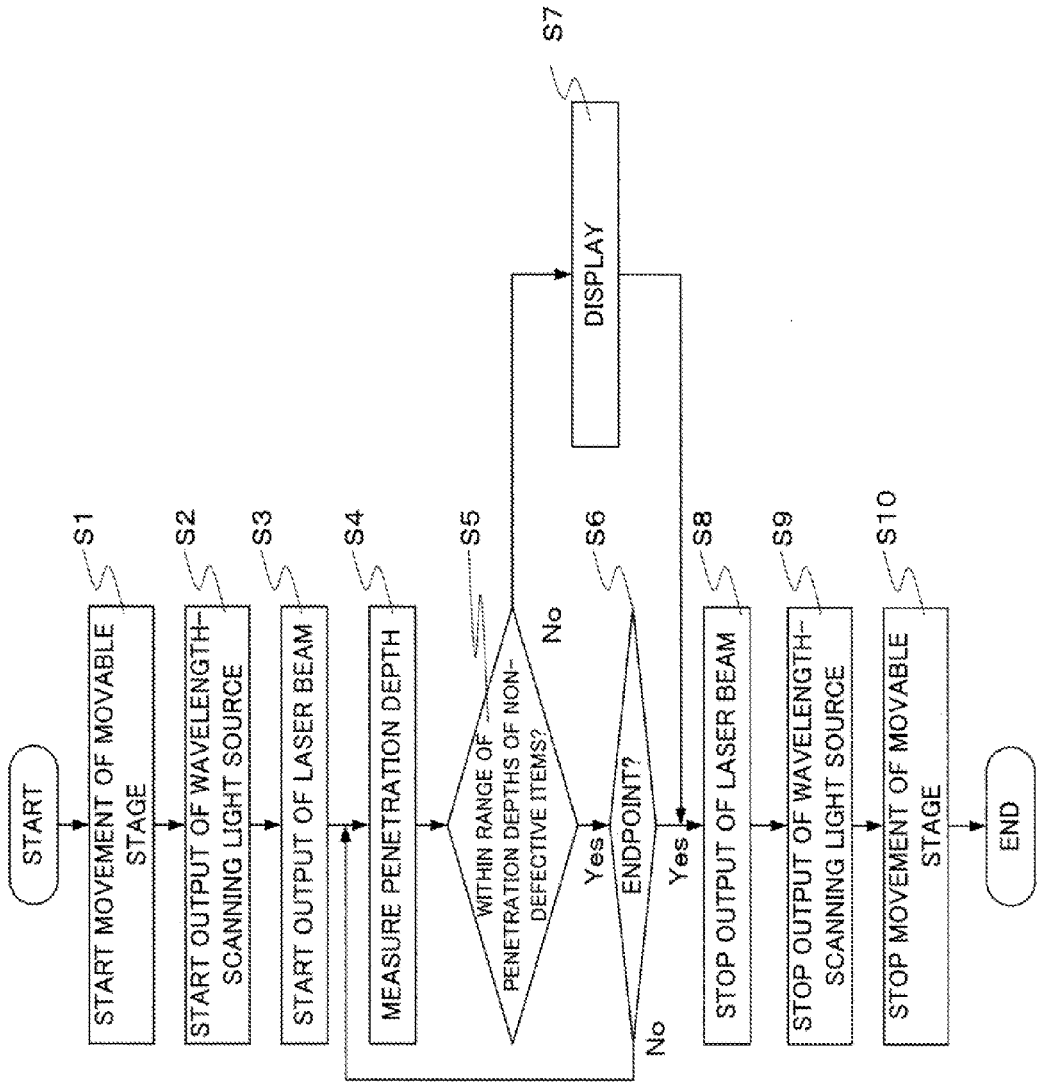
FIG. 6 is a flowchart showing operations of the laser welding apparatus according to the first embodiment.

Referring to the flow chart of FIG. 6, the operations of the laser welding apparatus 100 in FIG. 1 will be described below.

In step S1, the control unit 112a instructs the stage controller 111 to start moving the movable stage 110. Thus, the workpiece 101 fixed on the movable stage 110 starts moving.

In step S2, the control unit 112a instructs the wavelength-scanning light source 113 of the optical interferometer 105 to start outputting the measuring beam. Thus, the wavelength-scanning light source 113 starts wavelength scanning.

In step S3, the control unit 112a instructs the laser oscillator 107 to start outputting the laser beam 107a. Thus, the laser beam 107a is directed to the part to be welded (the same portion as the welded part 102) to start laser welding.

In step S4, the measuring unit 112b measures the penetration depth of the welded part 102 based on a signal from the optical interferometer 105.

In step S5, the evaluating unit 112c decides whether or not the measured penetration depth is in the range of depths of penetration of non-defective items, so that the quality of the welded part 102 is evaluated. In the case where the measured penetration depth is in the range of depths of penetration of non-defective items (Yes in step S5), the operation of the laser welding apparatus 100 advances to step S6. In the case where the measured penetration depth is not in the range of depths of penetration of non-defective items (No in step S5), the operation of the laser welding apparatus 100 advances to step S7.

In step S6, the control unit 112a decides whether or not the currently emitted laser beam 107a is located at the endpoint of a predetermined welding region on the workpiece 101. In the case where the currently emitted laser beam 107a is located at the endpoint (Yes in step S6), the operation of the laser welding apparatus 100 advances to step S8. In the case where the currently emitted laser beam 107a is not located at the endpoint (No in step S6), the operation of the laser welding apparatus 100 returns to step S4.

In step S7, the display 122 shows that the welded part 102 is defective. In this case, the laser welding apparatus 100 advances to step S8 without deciding whether or not welding on the workpiece 101 has been completed (step S6).

In step S8, the control unit 112a instructs the laser oscillator 107 to stop outputting the laser beam 107a. Thus, the emission of the laser beam 107a is completed.

In step S9, the control unit 112a instructs the wavelength-scanning light source 113 to stop outputting the measuring beam. Thus, the wavelength scanning is completed.

In step S10, the control unit 112a instructs the stage controller 111 to stop moving the movable stage 110. Thus, the movement of the workpiece 101 fixed on the movable stage 110 is stopped.

The operations of steps S1 to S10 are performed by the laser welding apparatus 100.

Another configuration of the laser welding apparatus 100 will be described below. The laser welding apparatus 100 in FIG. 1 includes the movable stage 110 that moves the workpiece 101, which is irradiated with the laser beam 107a, to move the irradiation position of the laser beam 107a. The laser welding apparatus 100 may include a galvano scanner on the optical path of the laser beam 107a, instead of the movable stage 110. The galvano scanner has a surface of reflection of the laser beam 107a. The galvano scanner can move the irradiation position of the laser beam 107a by changing the orientation of the surface of reflection of the laser beam 107a. Alternatively, the galvano scanner and the movable stage 110 may be combined to move the irradiation position of the laser beam 107a in the laser welding apparatus 100.

A reason for the use of the SS-OCT technique in the laser welding apparatus 100 will be discussed below. The penetration depth of the welded part 102 is expected to rapidly fluctuate on the order of several tens kHz. In order to precisely measure the rapidly fluctuating penetration depth of the welded part 102, the SS-OCT technique is adopted that uses the wavelength-scanning light source 113 capable of wavelength scanning on the order of several tens kHz. Another principle of OCT is time domain OCT (TD-OCT) in which a target distance is measured by moving the reference mirror 116. In the case where a TD-OCT technique is used for the laser welding apparatus 100, the reference mirror 116 needs to be moved according to the rapidly fluctuating penetration depth of the welded part 102. In TD-OCT, however, the position of the reference mirror 116 is changed by mechanical operations. Thus, it is not practical to move the reference mirror 116 according to the rapidly fluctuating penetration depth of the welded part 102. For this reason, the TD-OCT technique used for the laser welding apparatus 100 reduces the accuracy of measuring the penetration depth of the welded part 102.

Still another configuration of the laser welding apparatus 100 will be described below. The laser welding apparatus 100 may include a configuration in which the penetration depth of the welded part 102 is adjusted to a proper value by changing the welding conditions before the measured penetration depth exceeds the range of depths of penetration of non-defective items. This configuration can prevent the occurrence of defective items.

Specifically, the range of depths of penetration for a change of the welding conditions is set under more severe conditions than the range of depths of penetration of non-defective items. In the case where the measured penetration depth exceeds the range of depths of penetration for a change of the welding conditions, the control unit 112a changes the welding conditions so as to set the penetration depth of the welded part 102 to a proper value. The welding conditions include the output intensity of the laser beam 107a and the moving speed of the workpiece 101.

The output of the wavelength-scanning light source 113 will be described below. The output of the wavelength-scanning light source 113 needs to be adjusted such that the object beam 113a does not affect the welded part 102. For example, in the case where the output of the laser oscillator 107 is 300 W, the output of the wavelength-scanning light source 113 is set at 23 mW.

Second Embodiment

In the first embodiment, the spot 113c of the object beam 113a is circular. In a second embodiment, an object beam 113a has a linear spot 113c. A different point from the first embodiment will be discussed below and the explanation of the same point is omitted.

In a laser welding apparatus 200 according to the second embodiment, a second optical condenser system 120 in FIG. 1 is a cylindrical lens. Thus, the spot 113c of the object beam 113a focused on a welded part 102 is a linear spot.

Figure 7:
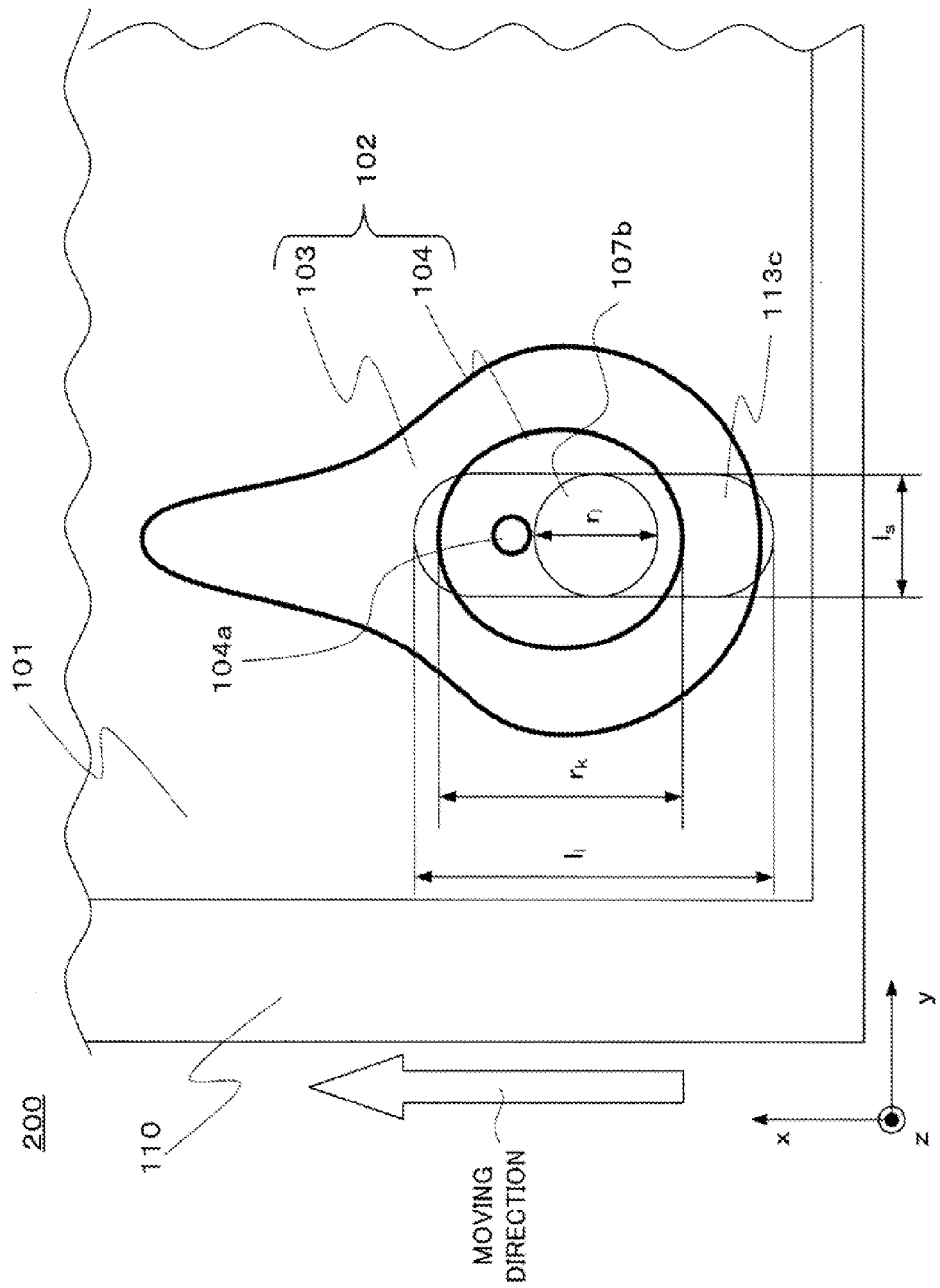
FIG. 7 is a schematic diagram showing the positional relationship between a keyhole, the spot of an object beam, and the spot of a laser beam according to a second embodiment.

FIG. 7 is a plan view of the welded part 102 viewed in the vertical direction (z direction) as in FIG. 3. FIG. 7 shows the positional relationship between a spot 107b of a laser beam 107a, the spot 113c of the object beam 113a, a keyhole 104, and a molten pool 103 in the case where the second optical condenser system 120 is a cylindrical lens. A movable stage 110 on which a workpiece 101 is fixed moves in a moving direction (x direction) indicated by an arrow in FIG. 7.

As illustrated in FIG. 7, the spot 113c of the object beam 113a is a linear spot. The cylindrical lens is disposed such that the direction of the major axis of the linear spot 113c is aligned with the moving direction of the movable stage 110. This is because the position of a bottom 104a of the keyhole 104 is likely to be deviated from the position of the spot 107b of the laser beam 107a in the moving direction of the movable stage 110.

In this configuration, the major axis and minor axis of the spot 113c of the object beam 113a have lengths of $l_1$ and $l_s$, respectively, on the surface of the workpiece 101. As in the first embodiment, the laser beam 107a has a spot diameter (diameter) of $r_l$ and the major axis of the keyhole 104 has a length of $r_k$ on the surface of the workpiece 101.

In the case where the major axis length $l_1$ of the spot 113c of the object beam 113a is larger than the length $r_k$ of the major axis of the keyhole 104, the bottom 104a of the keyhole 104 is properly irradiated with the object beam 113a. Specifically, the major axis length $l_1$ of the spot 113c of the object beam 113a may be at least three times the major axis length $r_l$ of the keyhole 104.

In the case where the major axis length $l_1$ of the spot 113c of the object beam 113a is at least three times the spot diameter $r_l$ of the laser beam 107a, the object beam 113a reflected at a location other than the keyhole 104 causes noise that does not contribute to the measurement of the depth of the keyhole 104. In the first embodiment, when the diameter $r_s$ of the circular spot 113c of the object beam 113a exceeds ten times the spot diameter $r_l$ of the laser beam 107a, the influence of noise is so strengthened that the depth of the keyhole 104 cannot be measured. In the second embodiment, the spot 113c of the object beam 113a is a linear spot. Thus, even if the major axis length $l_1$ of the spot 113c of the object beam 113a increases, the quantity of the object beam 113a reflected at a location other than the keyhole 104 is smaller than in the first embodiment. According to a prediction of the present inventors, in the case where the major axis length $l_1$ of the spot 113c of the object beam 113a is not more than 50 times the spot diameter $r_l$ of the laser beam 107a, the depth of the keyhole 104 can be measured.

The position of the bottom 104a of the keyhole 104 is rarely deviated from the position of the spot 107b of the laser beam 107a in the moving direction of the movable stage 110. However, in the case where the minor axis length $l_s$ of the spot 113c of the object beam 113a is extremely short, the bottom 104a of the keyhole 104 may not be irradiated with the object beam 113a. In order to avoid this problem, the minor axis length $l_s$ of the spot 113c of the object beam 113a is set at or not more than twice the spot diameter $r_l$ of the laser beam 107a.

As has been discussed, also in the second embodiment, the bottom 104a of the keyhole 104 is securely irradiated with the object beam 113a as in the first embodiment. Thus, the depth of the keyhole 104, that is, the penetration depth of the welded part 102 can be precisely measured.

Moreover, the laser welding apparatus 200 according to the second embodiment can reduce the quantity of the object beam (noise) reflected at a location other than the keyhole 104 unlike in the first embodiment. Hence, the depth of the keyhole 104 is measured in a state in which the influence of noise is lower than in the first embodiment. Because of the reduced influence of noise, the major axis length $l_1$ of the spot 113c of the object beam 113a can be longer than the spot diameter $r_s$ of the object beam 113a of the first embodiment. Thus, for example, even in the case where the bottom 104a of the keyhole 104 is deviated from the center position of the spot 107b of the laser beam 107a by a distance at least ten times the spot diameter $r_l$ of the laser beam 107a, the major axis length $l_1$ of the spot 113c of the object beam 113a is at least ten times the spot diameter $r_l$ of the laser beam 107a in the second embodiment, so that the bottom 104a of the keyhole 104 can be irradiated with the object beam 113a.

Third Embodiment

Figure 8:
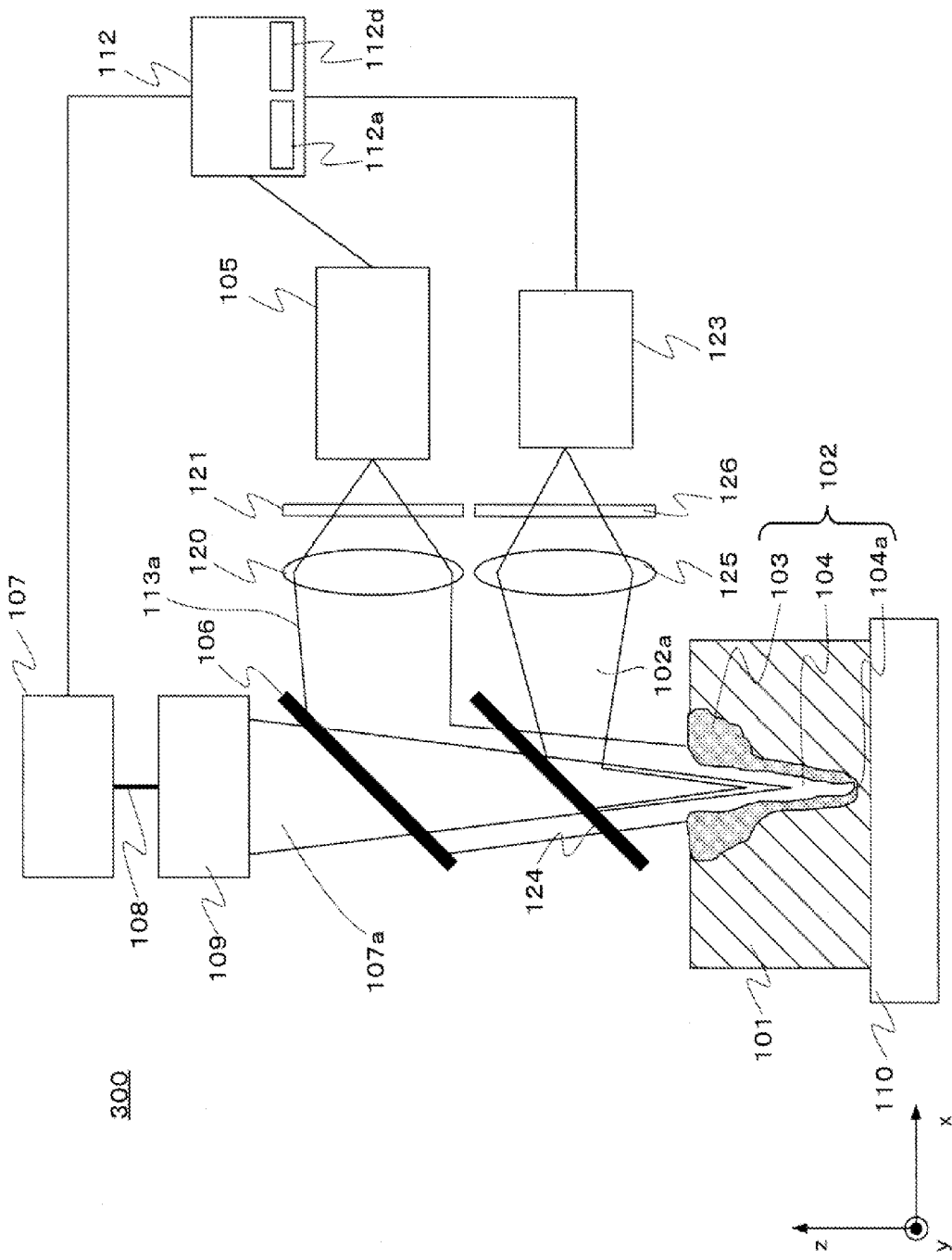
FIG. 8 is a schematic diagram illustrating the schematic configuration of the main part of a laser welding apparatus according to a third embodiment.
Figure 9:
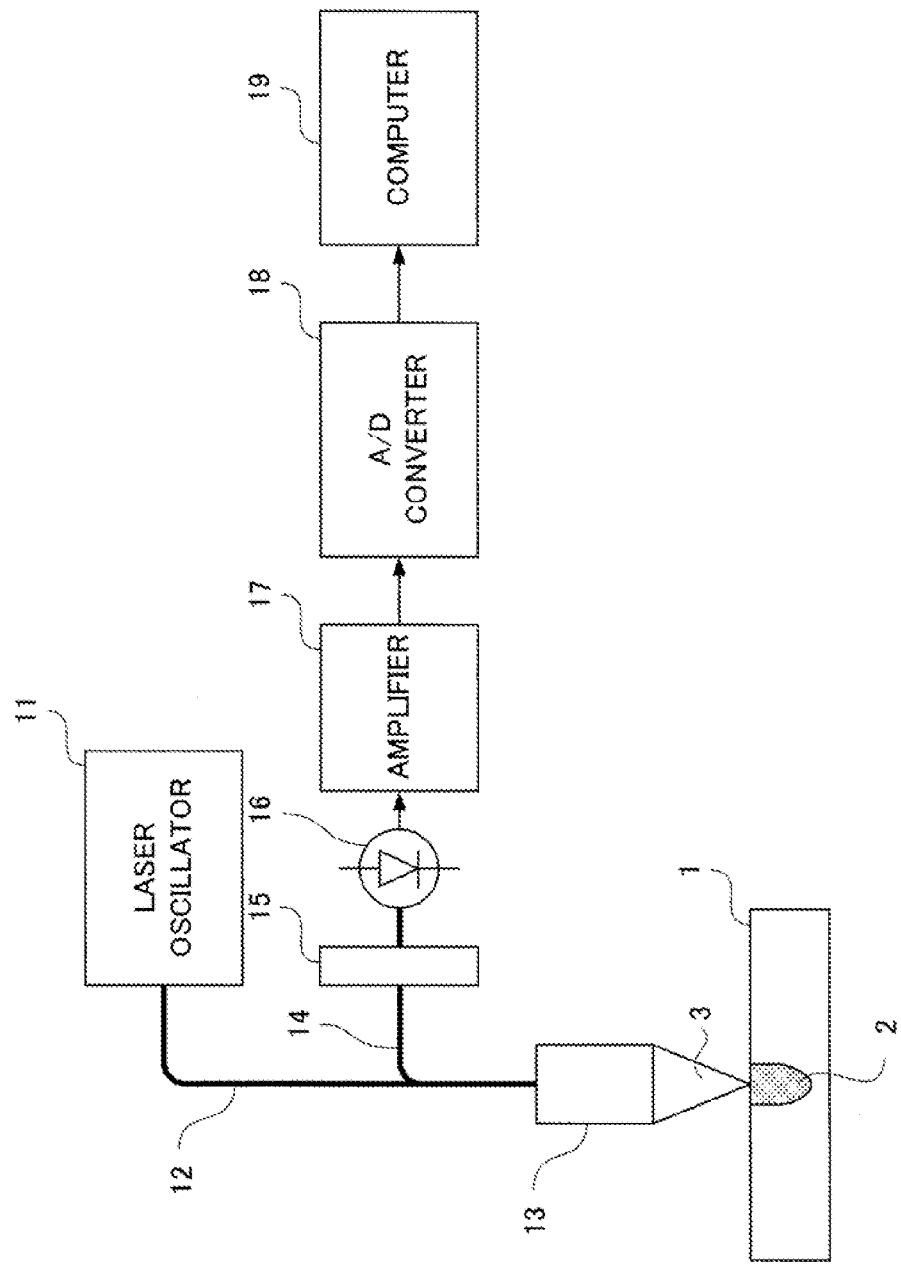
FIG. 9 is a schematic diagram illustrating a conventional laser welding apparatus.

FIG. 8 is a schematic diagram illustrating the configuration of the main part of a laser welding apparatus 300 according to a third embodiment. The third embodiment will describe the laser welding apparatus 300 including a spectroscope 123 that calculates the optical spectrum of light 102a emitted from a welded part 102 and a material specifying unit 112d that specifies the material of the welded part 102 from the calculated optical spectrum. A different point from the first embodiment will be discussed below and the explanation of the same point is omitted.

A workpiece 101 may have regions of different materials. When laser welding is shifted from one region to another region made of a different material during welding on the workpiece 101, the welding conditions need to be changed. In the case of unknown distribution of regions of different materials, the timing of changing the welding conditions cannot be determined beforehand. Furthermore, in the case of unknown materials, the welding conditions cannot be properly changed. Even in the case where the laser welding apparatus changes the welding conditions so as to have a proper penetration depth in the welded part 102 based on a measured penetration depth of the welded part 102, the welded part 102 of unknown materials may not have a proper penetration depth.

The third embodiment will describe the laser welding apparatus 300 that can specify the material of the welded part 102 and properly adjust a penetration depth under welding conditions suitable for the specified material.

The principle of a material specifying method by the laser welding apparatus 300 will be first discussed below.

A metal evaporated by a laser beam 107a in the welded part 102 is converted into plasma and emits light. The emitted light contains light varying in wavelength for each material. Thus, the light 102a emitted from the welded part 102 varies in optical spectrum for each material. This proves that a material can be specified by calculating, by means of the spectroscope 123, the optical spectrum of the light 102a emitted from the welded part 102.

The configuration and effect of the laser welding apparatus 300 will be described below.

The light 102a emitted from the welded part 102 is incident on the spectroscope 123 through a second beam splitter 124, a third optical condenser system 125, and a filter 126.

The second beam splitter 124, an example of a third optical element, is disposed on the optical axis of the laser beam 107a between a first beam splitter 106 and the workpiece 101. The second beam splitter 124 allows the passage of the laser beam 107a and an object beam 113a while reflecting light other than the laser beam 107a and the object beam 113a. For example, a laser oscillator 107 oscillates the laser beam 107a at a wavelength from 1064 nm to 1090 nm and an optical interferometer 105 (the wavelength-scanning light source 113 in FIG. 1) oscillates a measuring beam (object beam 113a) at a wavelength from 1270 nm to 1370 nm. In this case, the second beam splitter 124 allows the passage of light at a wavelength from 1064 nm to 1090 nm and at a wavelength from 1270 nm to 1370 nm, and reflects light at other wavelengths. The second beam splitter 124 guides the light 102a from the welded part 102 to the third optical condenser system 125.

The light reflected on the second beam splitter 124 is incident on the filter 126 through the third optical condenser system 125. The light reflected on the second beam splitter 124 contains the light 102a emitted from the welded part 102. The filter 126 allows only the passage of the light 102a at a wavelength necessary for calculation of an optical spectrum by means of the spectroscope 123. In the third embodiment, the light 102a at a wavelength from 400 nm to 800 nm is used for analysis in the spectroscope 123. Thus, the filter 126 allows only the passage of the light 102a in the wavelength range (from 400 nm to 800 nm). The light 102a having passed through the filter 126 is incident on the spectroscope 123.

The spectroscope 123 splits up the incident light 102a for each wavelength and detects the intensity of the split light for each wavelength, thereby calculating the optical spectrum of the incident light 102a. Information on the calculated optical spectrum is inputted to the material specifying unit 112d of a computer 112.

The material specifying unit 112d specifies the material of the welded part 102 based on the information on the optical spectrum. The computer 112 includes a storage (not shown) in which welding conditions for a plurality of materials are stored beforehand.

The object beam 113a reflected from the welded part 102 passes through the second beam splitter 124, is reflected on the first beam splitter 106, and then enters the optical interferometer 105. As has been discussed, the penetration depth of the welded part 102 is measured by the computer 112 based on the object beam 113a incident on the optical interferometer 105.

A control unit 112a of the computer 112 adjusts the welding conditions based on the measured penetration depth such that the welded part 102 has a proper penetration depth. At this point, the material of the welded part 102 has been specified by the material specifying unit 112d. Thus, the control unit 112a adjusts the welding conditions according to the material of the welded part 102. The laser welding conditions include, for example, the output intensity of the light beam and the moving speed of the workpiece 101.

As has been discussed, even in the case where the material of the workpiece 101 is unknown, the laser welding apparatus 300 according to the third embodiment can properly adjust the welding conditions such that the welded part 102 has a proper penetration depth.

Moreover, when the light 102a used for specifying a material is emitted from the welded part 102 and enters the optical interferometer 105, the light 102a causes noise unnecessary for measuring the penetration depth of the welded part 102. The light 102a that causes noise on the optical interferometer 105 is split by the second beam splitter 124. Hence, the laser welding apparatus 300 according to the third embodiment can prevent noise from entering the optical interferometer 105. This configuration improves the accuracy of measuring the penetration depth of the welded part 102.

The configuration of the laser welding apparatus 300 according to the third embodiment may be applied to the laser welding apparatus 100 of the first embodiment or the laser welding apparatus 200 of the second embodiment.

The preferred embodiment is sufficiently described while referring to the accompanying drawings, but various variations or modifications may be evident to those skilled in the art. It is, of course, understood that the variations or modifications are included in the preferred embodiments in so far as they do not deviate from the scope of the appended claims.

What is claimed is:

1. A laser welding apparatus for welding by a laser beam, comprising:
    a laser light source that emits the laser beam;
    a first optical element that coaxially emits, to a welded part, the laser beam and an object beam having a different wavelength from the laser beam;
    a second optical element that causes a spot diameter of the object beam to be larger than a spot diameter of the laser beam on the welded part;
    an optical interferometer that emits the object beam to the first optical element, detects through the first optical element the object beam reflected on the welded part, and generates an electric signal;
    a measuring unit that measures a penetration depth of the welded part based on the electric signal; and
    an evaluating unit that evaluates the welded part based on the penetration depth of the welded part,
    wherein the optical interferometer generates a coherent beam from the object beam and a reference beam, and generates the electric signal based on the coherent beam according to a difference in optical path length between the object beam and the reference beam,
    wherein the optical interferometer comprises:
        a wavelength-scanning light source that emits the object beam periodically varying in wavelength;
        a fiber coupler that splits the object beam reflected on the welded part; and
        a differential detector that converts, into electric signals, the object beam split by the fiber coupler and generates a differential component between the electric signals, and
    wherein the measuring unit measures the penetration depth of the welded part based on the differential component.

2. A laser welding apparatus for welding by a laser beam, comprising:
    a laser light source that emits the laser beam;
    a first optical element that coaxially emits, to a welded part, the laser beam and an object beam having a different wavelength from the laser beam;
    a second optical element that causes a spot diameter of the object beam to be larger than a spot diameter of the laser beam on the welded part;
    an optical interferometer that emits the object beam to the first optical element, detects through the first optical element the object beam reflected on the welded part, and generates an electric signal based on the detected object beam;
    a measuring unit that measures a penetration depth of the welded part based on the electric signal;
    an evaluating unit that evaluates the welded part based on the penetration depth of the welded part,
    a moving mechanism that moves an irradiation position of the laser beam;
    a third optical element that is disposed between the first optical element and the welded part to separate, from the laser beam and the object beam, light emanating from the welded part during melting of the welded part;

a spectroscope that detects, through the third optical element, the light emanating from the welded part and calculates an optical spectrum from the detected light;

a material specifying unit that specifies a material of the welded part based on the optical spectrum; and a control unit that controls one of an intensity of the laser beam and a moving speed of the irradiation position of the laser beam based on the penetration depth of the welded part and the material of the welded part, wherein the optical interferometer generates a coherent beam from the object beam and a reference beam, and generates the electric signal based on the coherent beam according to the difference in optical path length between the object and the reference beam.

* * * * *